(12) United States Patent
Gurovich et al.

(10) Patent No.: US 12,173,139 B1
(45) Date of Patent: Dec. 24, 2024

(54) MICROENCAPSULATED FIRE EXTINGUISHING AGENTS, METHOD OF PRODUCTION AND FIRE EXTINGUISHING PRODUCTS BASED ON SUCH MICROCAPSULES

(71) Applicant: GEBOR—FLARE UPS PREVENTION LTD, Bat Yam (IL)

(72) Inventors: Boris Gurovich, Bat Yam (IL); Nikolai Razguliaev, Moscow Region (RU)

(73) Assignee: GEBOR—FLARE UPS PREVENTION LTD, Bat Yam (IL)

( * ) Notice: Subject to any disclaimer, the term of this patent is extended or adjusted under 35 U.S.C. 154(b) by 0 days.

(21) Appl. No.: 18/515,293

(22) Filed: Nov. 21, 2023

(51) Int. Cl.
| | | |
|---|---|---|
| *C08K 9/12* | (2006.01) | |
| *A62C 35/10* | (2006.01) | |
| *A62D 1/00* | (2006.01) | |
| *B05D 7/20* | (2006.01) | |
| *C03C 25/25* | (2018.01) | |
| *C03C 25/42* | (2006.01) | |
| *C03C 25/47* | (2018.01) | |
| *C08K 5/00* | (2006.01) | |
| *C09K 21/00* | (2006.01) | |
| *C09K 21/02* | (2006.01) | |
| *C09K 21/08* | (2006.01) | |
| *C09K 21/14* | (2006.01) | |
| *D07B 1/14* | (2006.01) | |

(52) U.S. Cl.
CPC ............... *C08K 9/12* (2013.01); *A62C 35/10* (2013.01); *C03C 25/25* (2018.01); *C03C 25/42* (2013.01); *C03C 25/47* (2018.01); *C09K 21/02* (2013.01); *C09K 21/08* (2013.01); *C09K 21/14* (2013.01); *D07B 1/14* (2013.01); *D07B 2201/1096* (2013.01); *D07B 2205/3003* (2013.01); *D07B 2401/20* (2013.01)

(58) Field of Classification Search
None
See application file for complete search history.

(56) References Cited

U.S. PATENT DOCUMENTS

2023/0256279 A1 * 8/2023 Pashley ............... B01J 20/3238
169/47

FOREIGN PATENT DOCUMENTS

| | | | |
|---|---|---|---|
| CA | 2923361 A1 | * | 2/2010 |
| CA | 3153854 A1 | * | 6/2021 |
| CN | 116077881 | * | 5/2023 |
| JP | H0999291 A | * | 4/1997 |
| KR | 2454341 B1 | * | 10/2022 |
| RU | 2 389 525 | | 5/2010 |
| RU | 2 469 761 | | 12/2012 |
| RU | 2012 142 459 | | 4/2014 |
| RU | 2555 887 | | 7/2015 |
| RU | 2 580 132 | | 4/2016 |
| RU | 2 631 865 | | 9/2017 |
| RU | 2 631 868 | | 9/2017 |
| RU | 2631864 C1 | * | 9/2017 |
| RU | 179466 U1 | * | 5/2018 |
| RU | 2 748 844 | | 5/2021 |
| RU | 2 748 845 | | 5/2021 |
| WO | WO 2017/026919 | | 2/2017 |

OTHER PUBLICATIONS 1 page brochure for Zeolite from Google search, Downloaded on Jan. 29, 2024.*
1 page brochure for Structure of Zeolite from Google search, Downloaded on Jan. 29, 2024.*

* cited by examiner

*Primary Examiner* — Tae H Yoon
(74) *Attorney, Agent, or Firm* — PEARL COHEN ZEDEK LATZER BARATZ LLP

(57) ABSTRACT

A composition comprising a microencapsulated fire extinguishing agent, comprising: a fire extinguishing agent absorbed into a porous matrix; and a coating surrounding said porous matrix and a method for producing such a microencapsulated fire extinguishing agent.

11 Claims, 6 Drawing Sheets

200

| 202 | ACTIVATING A POROUS MATRIX |

| 204 | FILLING AN INNER VOLUME OF SAID ACTIVATED POROUS MATRIX WITH A FIRST LIQUID PHASE COMPRISING A FIRE EXTINGUISHING AGENT |

| 206 | EVAPORATING EXCESS OF SAID FIRST LIQUID PHASE |

| 208 | COVERING SUBSTANTIALLY ALL OF THE OUTER SURFACE OF SAID POROUS MATRIX WITH A SECOND LIQUID PHASE TO FORM A COATED POROUS MATRIX |

| 210 | EVAPORATING EXCESS OF SAID SECOND LIQUID PHASE |

| 212 | CURING AND DRYING SAID COATED POROUS MATRIX TO FORM A MICROENCAPSULATED FIRE EXTINGUISHING AGENT |

> 252: APPLYING TO A SUBSTRATE A MICROENCAPSULATED FIRE EXTINGUISHING COMPOSITION, THE COMPOSITION COMPRISING A FIRE EXTINGUISHING AGENT THAT IS ABSORBED INTO A POROUS MATRIX AND ENCAPSULATED BY A COATING SURROUNDING SAID POROUS MATRIX, WHEREIN THE MICROENCAPSULATED FIRE EXTINGUISHING COMPOSITION CREATES AN ACTIVE GAS ENVIRONMENT UPON CONTACT WITH A HEAT SOURCE TO STOP A COMBUSTION PROCESS OF A FIRE

FIG. 2B

MICROENCAPSULATED FIRE EXTINGUISHING AGENTS, METHOD OF PRODUCTION AND FIRE EXTINGUISHING PRODUCTS BASED ON SUCH MICROCAPSULES

TECHNICAL FIELD OF THE INVENTION

The present invention relates generally to autonomous fire extinguishing devices, more specifically to microencapsulated fire extinguishing agents and methods of preparing such fire extinguishing agents with specified response temperature parameters as well as the production of fire extinguishing products based on such microcapsules.

BACKGROUND OF THE INVENTION

Commercial fire extinguishers rely predominantly on extinguishing a fire by separating the three parts of the fire triangle: heat, fuel and oxygen. Commonly, a fire extinguishing agent (FEA) may be used in such extinguishers and applied to the heat source to retard or to stop the combustion process. Fire extinguishers include FEAs that are used in different aggregation states when tackling a fire, e.g. as a powder, liquid, or as a gas. Recently, fire extinguishers that incorporate a FEA inside of microcapsules have received significant attention.

Microcapsules have the ability to withstand mechanical stress and, as a result, they have previously been incorporated in the production of FEAs and used in the manufacturing process of fire-fighting products.

Microcapsules and products derived from them (e.g. fabrics, surfaces, cords, canvases, plates, etc.) are known in the art, e.g. present in RU No. 2 555 887, published on Jul. 10, 2015, RU No. 2 389 525, published on Jan. 20, 2009, RU No. 2 469 761, published on Dec. 20, 2012, RU No. 2 580 132, published on Apr. 10, 2014 and PCT application PCT/RU2016/000528, which are incorporated by reference herein in their entirety.

RU 2 389 525 may relate to microencapsulated fire extinguishing agents, method of their production, fire extinguishing composite materials, fire extinguishing coatings and fire extinguishing fabrics that include an inner first layer of polysiloxane and an outer layer made of gelatin and is incorporated by reference herein in its entirety. The apparent disadvantages of such products may lie in the slow release of the FEA within the capsule. As a result, release of the FEA only occurs at increased temperatures and can lead to long fire extinguishing times for a protected volume and reduced the effectiveness of fire extinguishing agent.

RU 2 631 868 may relate to the use of powdered microencapsulated extinguishing agents that include additives to reduce the heating times of a fire extinguishing composite material when exposed to a heat source and is incorporated by reference herein in its entirety. Addition of an aluminum powder to a polymer coating of microcapsules containing a fire extinguishing agent can lead to a reduced response time and, accordingly, can increase their efficiency.

RU 2012 142 459 may relate to microencapsulated FEAs that can be covered by an additional outer layer with a high absorption coefficient of radiant energy, and is incorporated by reference herein in its entirety. In order to further increase the response time of the microencapsulated FEAs, it was proposed to stain the microcapsule shell in black paint at the final stage of microcapsule formation.

However, despite the use of additional substances that may reduce the heating times of microcapsules to the activation temperature, microencapsulated products may belong to the group of thermally inactivated substances. The release of the FEA is slow and may only occur when the product is overheated, e.g. due to an increase in pressure of boiling FEA in the liquid phase within the microcapsule shell.

When using fragile shells in the preparation of microcapsules, the shell may readily be destroyed under minor mechanical and/or impact force leading to losses of FEA during storage, transportation and in the production of fire-fighting products.

RU2631865 may relate to combustion catalysts that are used to accelerate the activation of microcapsules and is incorporated by reference herein in its entirety. Disadvantages of the presented solutions may include a low rate of activation of microcapsules due to a high heat capacity of the FEAs, which require strong heating, as well as a low efficiency of the released FEAs, which are mostly released from the microcapsules in a liquid or vapor-gas state.

Accordingly, there is a need for fire extinguishing microcapsules with low response temperatures that release a FEA at low temperatures and effectively inhibit the generation of a fire or tackle and extinguish a fire at the early stages of the combustion process, e.g. during the ignition or growth of a fire, and the incorporation of such capsules in small-sized fire extinguishing devices.

SUMMARY OF THE INVENTION

Improvements and advantages of embodiments of the invention may include the provision of microcapsules of FEA in the superheated gas phase.

The creation of an active gas environment upon release of the FEA containing microcapsules may allow retarding or inhibiting the combustion process of a fire and may allow preventing flare ups after extinguishing a fire, e.g. within a protected volume.

One embodiment may include a composition including a microencapsulated fire extinguishing agent, including: a fire extinguishing agent absorbed into a porous matrix; and a coating surrounding said porous matrix.

In one embodiment, said fire extinguishing agent is a perfluorinated agent.

In one embodiment, said perfluorinated agent is selected from the group consisting of: Novec-1230, FK-5-1-12, and combinations thereof.

In one embodiment, said fire extinguishing agent has a boiling point of less than 40° C. In one embodiment, said porous matrix includes zeolite, vermiculite, or a combination thereof.

In one embodiment, said porous matrix is mechanically rigid. In one embodiment, said coating is a single-component polymer or a multi-component polymer.

In one embodiment, said coating is selected from the group consisting of: sodium silicate, polyvinyl alcohol, and combinations thereof.

In one embodiment, said coating includes a heat-accumulating material selected from the group consisting of: aluminum powder, aluminum oxide, and combinations thereof.

In one embodiment, said fire extinguishing agent is activated by an external temperature in a range of 110 to 130° C.

In one embodiment, said fire extinguishing agent occupies at least 40% of an internal volume of said porous matrix.

In one embodiment, said composition consists essentially of spherical or substantially spherical particles having an external diameter in a range of about 0.5 mm to about 1.5 mm.

One embodiment may include a method for producing a microencapsulated fire extinguishing agent, the method including: activating a porous matrix; filling an inner volume of said activated porous matrix with a first liquid phase including a fire extinguishing agent; evaporating excess of said first liquid phase; covering substantially all of the outer surface of said porous matrix with a second liquid phase to form a coated porous matrix; evaporating excess of said second liquid phase; and curing and drying said coated porous matrix to form a microencapsulated fire extinguishing agent.

In one embodiment, said fire extinguishing agent includes a fluorinated fire-extinguishing agent, or a combination thereof.

In one embodiment, filling said internal volume of said activated porous matrix includes filling said activated porous matrix with said fire extinguishing agent to at least 40% of an internal volume.

One embodiment may include a method of preventing or fighting a fire, including applying to a substrate a microencapsulated fire extinguishing composition, the composition including a fire extinguishing agent that is absorbed into a porous matrix and encapsulated by a coating surrounding said porous matrix, wherein the microencapsulated fire extinguishing composition creates an active gas environment upon contact with a heat source to stop a combustion process of a fire.

In one embodiment, said method of preventing or fighting a fire includes applying said fire extinguishing composition to a product selected from the group consisting of: a cord, a plate, and fabrics.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A depicts a flowchart of a method for producing a microencapsulated fire extinguishing agent, according to some embodiments of the present invention.

FIG. 2B depicts a flowchart of a method of preventing or fighting a fire, according to some embodiments of the present invention.

Figure 1:
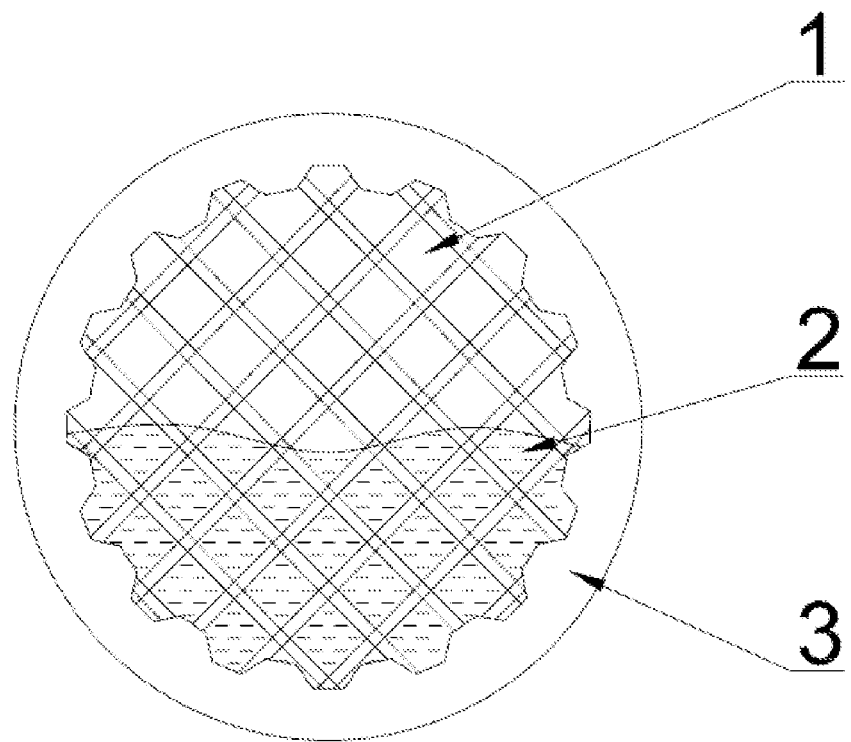
FIG. 1 is a schematic drawing of a cross-section of a microcapsule, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

One embodiment may include a composition comprising a microencapsulated fire extinguishing agent (FEA), including: a fire extinguishing agent absorbed into a porous matrix; and a coating surrounding said porous matrix.

In some embodiments, the composition comprises a microencapsulated fire extinguishing agent (FEA). A fire extinguishing agent may be a reagent that acts as a flame retarding agent, e.g. by creating an oxygen deficient atmosphere and/or acting as a heat removing, endothermic agent.

Fire extinguishing agents may be, for example, fluorinated or perfluorinated compounds such as perfluoro(2-methyl-3-pentanone) also referred to as Novec-1230, Novec 649 or FK-5-1-12. Perfluoro (2-methyl-3-pentanone) is a fully fluorinated analog of ethyl isopropyl ketone and may exist in liquid form at atmospheric pressure and room temperature. Alternatively, a fire extinguishing agent as disclosed herein may be any other fluorine-containing substances that has the features of a FEA and a boiling point below 40° C.

Structurally, a fire extinguishing agent may be absorbed into a porous matrix, e.g. spherical hollow matrix and may form the core of the composition. A matrix may be a finely dispersed absorbent material of spherical shape. Materials suitable for their use as a matrix may include microporous materials, e.g. crystalline aluminosilicate such as zeolite, vermiculite and other coarsely porous materials. For example, zeolite or vermiculite may have a pore size between 0.1 nm to 1 nm. In some examples, a porous matrix, e.g. a microsphere, may be a naturally occurring porous matrix or may be obtained chemically, as known to a person skilled in the art. In some examples, a porous matrix may have a low temperature stability. Absorption of the fire extinguishing agent into a porous matrix, e.g. during the steps of filling matrices and subsequent evaporation of an excess of fire extinguishing agents, may lead to a porous matrix that includes sealed or partially sealed pores.

In one embodiment, the porous matrix is mechanically rigid. A fire extinguishing agent may be placed in a mechanically rigid matrix and may be released when activated in the superheated gas phase. In this context, "rigid" or "mechanically rigid" may refer to the stiffness of the backbone of a porous matrix. For example, a zeolite framework may include a dense network of Si—O—Al, Si—O—Si, and Al—O—Al linkages. Cavities and/or channels within the network may be filled with a FEA and may release a FEA without alterations to the structural integrity of the backbone. Thus, the stiffness of the backbone of the porous matrix may limit or avoid deformation of the backbone and collapse of such cavities and/or channels.

Matrices that have absorbed a FEA, e.g. perfluorinated compounds such as perfluoro(2-methyl-3-pentanone), in their porous network may be covered with a coating, for example a coating that includes a polymer-based material. Suitable reagents for the coating of matrices that have absorbed a FEA may include polyvinyl alcohol, sodium silicate and other single-component or multicomponent polymers. In some embodiments, a heat-accumulating material may be added to the coating or may be part of the coating. For example, a heat-accumulating material such as aluminum powder, aluminum oxide, and combinations thereof may be added to the coating. The diameter of the resulting coated microcapsules may be slightly larger than the starting fraction of the particles of the porous matrix in a range of about 0.5-1.5 mm. In one embodiment, a composition is particulate and a coating, e.g. a coating via a polymer-based material, is applied to individual particles. In this way, a polymer coating may surround individual particles of a matrix, e.g. a porous matrix.

A content of a fire extinguishing agent that is absorbed into a porous matrix, e.g. that may be located in an internal volume of a porous matrix, may be determined by obtaining the weight of a defined amount of porous matrix prior to absorption of a fire extinguishing agent and obtaining the weight of a defined amount of porous matrix after absorption of a fire extinguishing agent and calculation of a weight ratio of porous matrix and porous matrix after absorption of a fire extinguishing agent. In one embodiment, a composition may include a fire extinguishing agent that occupies at least 40% of an internal volume of a porous matrix. In one embodiment, a composition may include a fire extinguishing agent that occupies at least 50% of an internal volume of a porous matrix. In one embodiment, a composition may include a fire extinguishing agent that occupies at least 60% of an internal volume of a porous matrix. In one embodiment, a composition may include a fire extinguishing agent that occupies at least 70% of an internal volume of a porous matrix. In one embodiment, a composition may include a fire extinguishing agent that occupies at least 80% of an internal volume of a porous matrix. In one embodiment, a composition may include a fire extinguishing agent that occupies at least 90% of an internal volume of a porous matrix.

In some embodiments, a composition has a spherical or substantially spherical shape. In this context, "substantially" can be a shape that differs from a spherical shape by +−5%. A composition that includes a microencapsulated fire extinguishing agent may have an external diameter in a range of about 0.5 mm to about 1.5 mm. The term "about" in reference to a numerical value stated herein may be understood as the stated value+/−10%.

Absorption of an FEA into a porous matrix and coating of the FEA-filled or partially FEA-filled matrix with a coating agent may allow an FEA which is located inside the coating shell to reach a temperature that is well above the boiling point of the FEA. For example, an FEA such as perfluoro (2-methyl-3-pentanone) has a boiling point of 49.2° C. but may reach a temperature that is substantially higher than the boiling point, e.g. a temperature that is 5° C., 10° C., 20° C. or 50° C. above the boiling point. Absorption of a FEA into a solid porous matrix, e.g. a microporous matrix, may lead to a filled or partially filled matrix in which the FEA replaces gas molecules within the porous network. Coating of the filled or partially filled matrix with a coating, e.g. a polymer such as polyvinyl alcohol, may lead to a filled or partially filled matrix in which the FEA is trapped within the coating and cannot be released of the porous matrix unless the coating undergoes disintegration, e.g. initiated by a heat source. Accordingly, release of an FEA from a coated matrix may depend on the properties of the coating, the particle size and the boiling point of the FEA. Thus, when a composition is located near a heat source, e.g. a fire, and the melting point of the coating is substantially higher than the boiling point of the FEA, the FEA may reach a superheated gas phase before the coating is affected by the heat source in its structural integrity. The structural integrity of the coating may be tailored by the polymer composition and thickness of the polymer coating. Thus, a coating may allow an FEA located inside a porous matrix to reach a superheated vapor phase when the FEA is heated to or beyond its normal boiling point at atmospheric pressure. Upon disintegration of the coating, the FEA may be released as a superheated vapor. Advantageously, the FEA in superheated vapor form may lead to an immediate release of the FEA in the particle surrounding environment and may thus, create an atmosphere that includes a substantial amount of FEA thereby replacing fire accelerating gases, e.g. oxygen, that are in close proximity to the heat source, e.g. a fire, and may retard or extinguish a fire.

In particular, a composition including mechanically rigid matrices filled with FEA up to 40% of the internal free volume may provide an effective way of storing an FEA, protecting the FEA against mechanical stress, e.g. during the use of an item containing the FEA, and may enable its release in the most efficient superheated gas phase since the composition may enable a rapid transition of the absorbed FEA into a superheated gas phase.

Microcapsules may release superheated FEA when exposed to heat source, e.g. a fire, at a defined temperature. For example, compositions comprising a microencapsulated fire extinguishing agent may be activated and, thus, may release an FEA at an external temperature in a range of 110 to 130° C. Alternatively, microcapsules including an FEA may have the ability to release superheated FEA when exposed to heat of 120 (+5)° C.

An advantage of the microcapsules may be their stable activation temperature, resistance to mechanical stress and high efficiency of released superheated FEA. Accordingly, in one embodiment, a composition comprising a microencapsulated fire extinguishing agent microcapsules may require a significantly reduced amount of FEA.

FIG. 1 shows an example of a microcapsule including a porous matrix 1, FEA in the liquid phase 2 absorbed into the pores of porous matrix 1 and a polymer coating 3. The outer diameter of the microcapsules depicted in FIG. 1 may range from 0.5 to 1.5 mm.

For example, a composition that comprises a microencapsulated fire extinguishing agent, including a fire extinguishing agent absorbed into a porous matrix and a coating surrounding the porous matrix may have the following ratio of components, provided in weight percent (wt %): A composition may include 40 wt % FEA in the liquid phase, absorbed into a porous matrix that forms 57 wt % of the composition and a coating made of polymer material that may account for 3 wt % of the composition. In one embodiment, a microencapsulated FEA, e.g. as shown in FIG. 1, may be activated at a temperature of 120 (±5)° C. In one embodiment, a microencapsulated FEA, e.g. as shown in FIG. 1, may be activated at a temperature range between 110 to 130° C. For example, a microencapsulated FEA coated with a coating, e.g. as shown in FIG. 1, may have a diameter in the range between 0.5 to 1.5 mm.

A fire extinguishing product can be made in the form of a plate including a substrate with an adhesive layer, a polymer matrix and briquetted microcapsules. The briquetted microcapsules may include a composition including a microencapsulated fire extinguishing agent as disclosed herein.

Alternatively, a fire extinguishing product can be produced in the form of a cord, e.g. a braid which includes a heat-resistant thread containing a heating composition and briquetted microcapsules.

For example, surfaces covered with compositions that include a microencapsulated FEA may be used to tackle smoldering fires and may prevent potential flare ups of a fire.

FIG. 2A depicts a flowchart of a method 200 for producing a microencapsulated fire extinguishing agent, according to some embodiments of the present invention.

Figure 3:
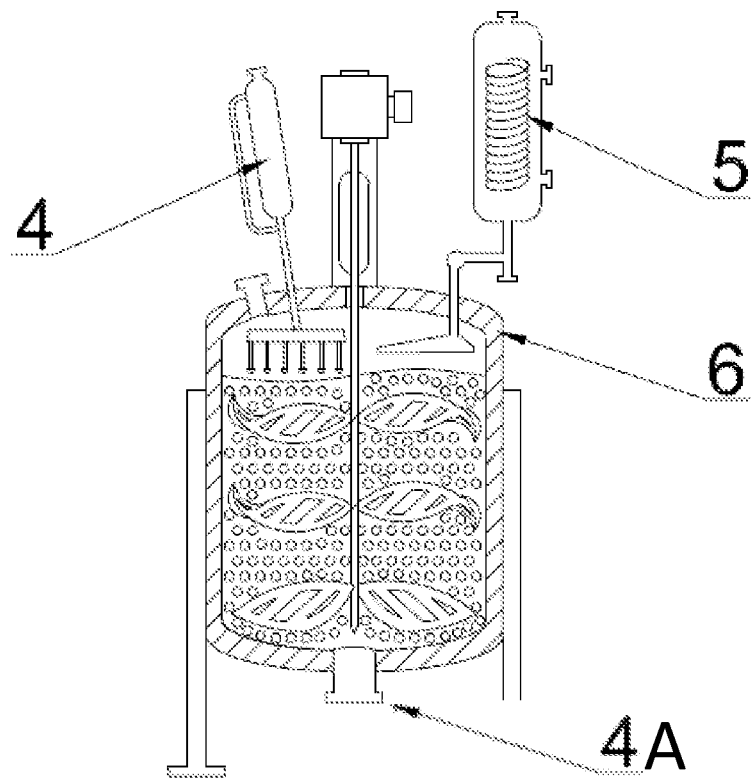
FIG. 3 is a schematic drawing of a design of a reactor for serial production of microcapsules, according to some embodiments of the invention.

In operation, a porous matrix may be activated (step 202). Activation of a porous matrix, e.g. vermiculite, zeolite, or a combination thereof, may proceed by heating porous matrices in a reactor, e.g. a reactor as shown in FIG. 3, to an elevated temperature, e.g. 60° C. under vacuum, e.g. a pressure of 0.1 atm, for a defined period of time, e.g. 1 hour. In some embodiments, prior to the activation step, a batch of matrices, e.g. porous matrices, may be separated into fractions according to the diameter of the required microcapsules, e.g. using a vibrating sieve. A separated fraction may be fraction that includes matrices having a diameter of 0.5, 1.0 or 1.5 mm.

In operation, an inner volume of an activated porous matrix may be filled with a first liquid phase including a fire extinguishing agent (step 204). For example, a first liquid phase may be an FEA, e.g. a fluorinated FEA such as perfluoro(2-methyl-3-pentanone) or a solution of a FEA such as perfluoro(2-methyl-3-pentanone) in a solvent, e.g. an organic solvent. In one embodiment, after addition of a first liquid phase, the reactor is gradually heated to a temperature of 40° C. at a defined stirrer speed, e.g. a speed of 60 r.p.m. For example, an internal volume of an activated porous matrix may be filled with a fire extinguishing agent to at least 40% of an internal volume. In one embodiment, an internal volume of an activated porous matrix is filled with a FEA to at least 50% of an internal volume. In one embodiment, an internal volume of an activated porous matrix is filled with a FEA to at least 60% of an internal volume. In one embodiment, an internal volume of an activated porous matrix is filled with a FEA to at least 70% of an internal volume. In one embodiment, an internal volume of an activated porous matrix is filled with a FEA to at least 80% of an internal volume. In one embodiment, an internal volume of an activated porous matrix is filled with a FEA to at least 90% of an internal volume.

In operation, excess of a first liquid phase that is present in a reactor is evaporated (step 206). In one embodiment, the evaporation of a first liquid phase, e.g. perfluoro(2-methyl-3-pentanone), may proceed by gradually cooling the inner temperature of the reactor to a temperature below room temperature, e.g. to a temperature of 1° C. at a vacuum of about 0.1 atm, e.g. using vacuum cooler 5 as shown in FIG. 3.

In operation, all of the outer surface of a porous matrix may be substantially covered with a second liquid phase to form a coated porous matrix (step 208). A second liquid phase may be a coating including a single-component polymer or a multi-component polymer. Alternatively, a coating may be sodium silicate, polyvinyl alcohol, or a combination thereof. For example, a second liquid phase may be sodium silicate in distilled water. Optionally, sodium silicate may be mixed with water prior to addition of the mixture to the reactor to create a homogeneous emulsion. In some embodiments, after addition of a second liquid phase to the reactor, the suspension in the reactor may be stirred for a defined time period, e.g. 1 hour at room temperature at a stirred speed of 30 r.p.m. until a homogeneous emulsion is obtained.

In operation, excess of a second liquid phase is evaporated (step 210). In one embodiment, the evaporation of a second liquid phase, e.g. sodium silicate in water, may proceed by gradually heating the inner temperature of the reactor to a temperature of 60° C. and applying a vacuum of about 0.1 atm, e.g. using vacuum cooler 5 as shown in FIG. 3.

In operation, the coated porous matrix may be cured and dried to form a microencapsulated fire extinguishing agent (step 212). For example, microencapsulated fire extinguishing agents may be dried in a drying chamber at a temperature of 25° C. for a defined time period, e.g. 24 hours.

A microencapsulated fire extinguishing agent may be produced by a matrix absorption method. The production of microencapsulated fire extinguishing agents may be carried out in a sealed reactor according to the following steps:

1) Preparation of matrices;
2) Filling the matrices with FEA;
3) Evaporation of excess FEA from the matrices;
4) Preparation of film-former;
5) Applying a uniform layer of film-former to the matrices;
6) Evaporation of solvent from the film-former;
7) Curing of the film-former; and
8) Drying of finished microcapsules.

FIG. 2B depicts a flowchart of a method 250 of preventing or fighting a fire, according to some embodiments of the present invention.

In operation, a microencapsulated fire extinguishing composition including a fire extinguishing agent that is absorbed into a porous matrix and encapsulated by a coating surrounding said porous matrix may be applied to a substrate (step 252). A microencapsulated fire extinguishing composition may create an active gas environment upon contact with a heat source to stop a combustion process of a fire.

For example, a fire extinguishing composition may be applied to a product selected from a cord, a plate, and fabrics. An active gas environment may be created since the microencapsulated fire extinguishing composition may include an FEA that is heated by a heat source to reach a superheated gas phase before the coating is affected by the heat source in its structural integrity leading to the release of the FEA.

FIG. 3 shows an example of a matrix absorption reactor for mass production of microcapsules including an inlet 4, e.g. coating dispenser, a vacuum evaporator 5 and a loading tank 6.

In one embodiment, a method for producing a microencapsulated fire extinguishing agent is based on matrix absorption of a FEA into a porous matrix and may include the following steps:

- Separating a batch of matrices, e.g. porous matrices, into fractions according to the diameter of the required microcapsules.
- Loading a reactor, e.g. the reactor shown in FIG. 3, with the required fraction of matrices and, in order to remove the residual moisture contained in them, drying the matrices under vacuum at a temperature of +60° C. and at a stirrer speed of 30 r.p.m.
- Addition of an FEA (e.g. in the liquid phase) to the dried matrices via an upper inlet of the reactor, e.g. inlet 4, and heating the reactor to a temperature of +40° C. at a stirrer speed of 60 r.p.m.
- Cooling the matrices filled with the vapor-gas phase of FEA to room temperature and vacuumizing the filled matrices to remove excess FEA in the gas phase from the reactor, e.g. using vacuum evaporator 5.
- Mixing a coating reagent with a solvent to create a coating emulsion of a desired viscosity.
- Addition of the prepared coating emulsion to the reactor through a dispenser, e.g. inlet 4, in small portions and stirring the suspension at room temperature and at a stirrer speed of 30 r.p.m. until a homogeneous mixture is obtained.
- Gradually heating the reactor to a temperature of +60° C. at a stirrer speed of 200 r.p.m. to evaporate approximately 80% of the solvent from the coating emulsion.
- Cooling the prepared microcapsules to room temperature and removing the microcapsules from the reactor and subsequent drying of the microcapsule composition at a temperature of 25° C. for at least 24 hours in a drying chamber.

In an example, a method for producing a microencapsulated fire extinguishing agent may include the following stages:

- 1000 kg batches of matrices may be separated into fractions with diameters of 0.5, 1.0 and 1.5 mm using a vibrating sieve;
- 100 kg of the required matrix fraction may be loaded into loading tank 6;
- in order to remove contained residual moisture the matrices may be dried in loading tank 6 for 1 hour under a pressure of 0.1 atm at a temperature of +60° C. and at a stirrer speed of 30 r.p.m.;
- 75 kg FEA in the liquid phase may be poured to the dried matrices through the upper flood cock of the loading tank 6 and the loading tank 6 is heated at a speed of +1° C. per minute to +40° C. at a stirrer speed of 60 r.p.m.;
- the matrices filled with the FEA in vapor-gas phase may be cooled at a speed of minus 1° C. per minute to room temperature and a vacuum (e.g. a pressure of 0.1 atm) may be applied to remove 5 kg excess FEA in the gas phase through a vacuum cooler 5;
- 3 kg of film-former may be mixed with 15 kg of solvent in a mixer to create homogeneous emulsion;
- through the film-former dispenser 4, the prepared film-former may be poured into loading tank 6 by portions of 0.5 kg per minute and the suspension may be stirred for 1 hour until homogeneous condition at room temperature and at a stirrer speed of 30 r.p.m.;
- by heating the loading tank 6 at a speed of +1° C. per minute to +60° C. at a stirrer speed of 200 r.p.m. 12 kg of solvent may be evaporated from the film-former and removed through a vacuum cooler 5;
- the resulting microcapsules may be cooled at a speed of minus 1° C. per minute to room temperature and unloaded from loading tank 6 through the lower flood cock, then dried for 24 hours in a drying chamber at a temperature of +25° C.

EXAMPLES

Example 1

A microencapsulated fire extinguishing agent may be prepared using a batch reactor, e.g. a batch reactor as shown in FIG. 3. A batch reactor may include a loading tank 6 and may be equipped with an inlet 4, an outlet 4A and a vacuum cooler 5 that allows removing reagents e.g. solvents from the reaction vessel by applying a vacuum.

In one embodiment, a method for the production of a composition including a microencapsulated FEA may proceed using FK-5-1-12, a porous matrices having a diameter of 0.5 mm made from zeolite and a polyvinyl alcohol coating (hereinafter referred to as PVA):

1) From 1000 kg batches of zeolite, 200 kg of fractions with a diameter of 0.5 mm are separated using a vibrating sieve.
2) 100 kg zeolite with a diameter of 0.5 mm is loaded into loading tank 6.
3) The zeolite is dried in loading tank 6 for 1 hour under a pressure of 0.1 atm (10132.5 Pa) at a temperature of +60° C. and at a stirrer speed of 30 rounds per minute (r.p.m.) to remove residual moisture that is present in the zeolite matrix.
4) 75 kg of FK-5-1-12 in the liquid phase is poured into the dried, activated zeolite via inlet 4 of loading tank 6 and loading tank 6 is heated at a speed of +1° C. per minute to +40° C. at a stirrer speed of 60 r.p.m.
5) Zeolite filled with the vapor-gas phase of FK-5-1-12 is cooled by applying a temperature gradient of minus 1° C. per minute until room temperature and a vacuum of 0.1 atm (10132.5 Pa) is applied to remove 5 kg excess FK-5-1-12 in the gas phase through vacuum cooler 5.
6) 3 kg PVA is mixed with 15 kg of distilled water in a mixer until homogeneous emulsion is created.
7) PVA solution is poured into loading tank 6 in portions of 0.5 kg per minute via inlet 4 and the suspension is stirred for 1 hour at room temperature and at a stirrer speed of 30 r.p.m. until a homogeneous emulsion is obtained.
8) Loading tank 6 is heated by applying a temperature gradient of +1° C. per minute at a stirrer speed of 200 r.p.m. until a temperature of +60° C. is reached. 12 kg of distilled water are evaporated from the PVA solution and removed through vacuum cooler 5.
9) The resulting microcapsules are cooled to room temperature at a temperature gradient of minus 1° C. per minute and unloaded from loading tank 6 via outlet 4A. The microcapsules are dried in a drying chamber at a temperature of +25° C. for 24 hours to obtain a composition including a micro encapsulated fire extinguishing agent. The diameter of the resulting coated microcapsules may be slightly larger than the starting fraction of the zeolite particles of about 0.5 mm.

Example 2

Microencapsulated fire extinguishing agent may be prepared using a batch reactor, e.g. a batch reactor as shown in FIG. 3. A batch reactor may include a loading tank 6 and may be equipped with an inlet 4, an outlet 4A and a vacuum cooler 5 that allows removing reagents e.g. solvents from the reaction vessel by applying a vacuum.

In one embodiment, a method for the production of a composition including a microencapsulated FEA may proceed using Novec-1230, a porous matrices having a diameter of 0.5 mm made from vermiculite and a sodium silicate coating:

The production of microcapsules with an FEA such as Novec-1230, matrices with a diameter of 1.0 mm from vermiculite and a cover of sodium silicate may include:

1) From 1000 kg batches of vermiculite 200 kg of fractions with a diameter of 1.0 mm are separated using a vibrating sieve.
2) 100 kg vermiculite with a matrix diameter of 1.0 mm is loaded into loading tank 6.
3) Vermiculite is dried in loading tank 6 for 1 hour under a pressure of 0.1 atm (10132.5 Pa) at a temperature of +60° C. at a stirrer speed of 30 r.p.m. to remove residual moisture that is present in the vermiculite matrix.
4) 75 kg of Novec-1230 in the liquid phase is poured into the dried vermiculite via inlet 4 of the loading tank 6 and the loading tank 6 is heated at a speed of +1° C. per minute to +40° C. at a stirrer speed of 60 r.p.m.
5) Vermiculite filled with the vapor-gas phase of Novec-1230 is cooled by applying a temperature gradient of minus 1° C. per minute until room temperature and a vacuum of 0.1 atm (10132.5 Pa) is applied to remove 5 kg excess Novec-1230 in the gas phase through vacuum cooler 5.
6) 3 kg sodium silicate and 15 kg of distilled water are mixed to create homogeneous emulsion.
7) Silicate solution is poured into loading tank 6 in portions of 0.5 kg per minute and the suspension is stirred for 1 hour at room temperature and at a stirrer speed of 30 r.p.m. until a homogenous emulsion is obtained.
8) Loading tank 6 is heated by applying a temperature gradient of +1° C. per minute at a stirrer speed of 200 r.p.m until a temperature of +60° C. is reached. 12 kg of distilled water is evaporated from sodium silicate and removed through a vacuum cooler 5.
9) The resulting microcapsules are cooled to room temperature at a temperature gradient of −1° C. per minute and unloaded from loading tank 6 via outlet 4A. The microcapsules are dried in a drying chamber at a temperature of +25° C. for 24 hours and a composition including a micro encapsulated fire extinguishing agent is obtained. The diameter of the resulting coated microcapsules may be slightly larger than the starting fraction of the vermiculite particles of about 1.0 mm.

Example 3: Briquetted Microcapsules

Microcapsules that are homogenized into large agglomerates can be successfully used as an independent fire extinguishing device, and can also be used as a raw material for the production of various types of fire extinguishing devices for various purposes: plates, cords, capes, etc. The produced briquettes can have a required elasticity, heat resistance, gas permeability, shape, thickness and overall dimensions. The properties of fire extinguishing devices may be amended in their physical properties by the addition of fillers or plasticizers to the composition. By adjusting the percentage of microcapsules in the briquette, the amount of FEA contained in the finished fire extinguishing product can be modified.

Polyurethane or silicone, as well as other single-component and multicomponent polymers, can be used as polymer that holds microcapsules together.

In addition, heat-accumulating fillers in the form of aluminum oxide, aluminum powder and other fillers may be added to the polymer.

Figure 4:
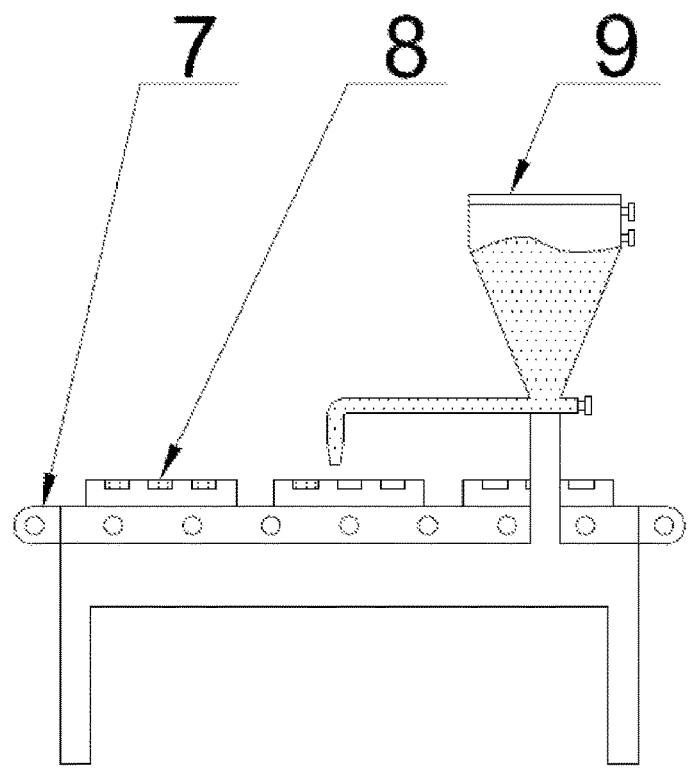
FIG. 4 is a schematic drawing of a device for the production of briquetted microcapsules, according to some embodiments of the invention.

FIG. 4 shows an arrangement for the mass production of briquetted microcapsules. The apparatus depicted in FIG. 4 comprises conveyor belt 7, molding cassettes 8 and pneumatic dispenser 9.

The production cycle of briquetted microcapsules may include the following stages:

1) Mixing the polymer components in a mixer.
2) Mixing microcapsules of a desired diameter and the prepared polymer of step 1 in a mixer until homogeneous suspension is obtained.
3) Pouring the homogeneous suspension of step 3 into pneumatic dispenser 9.
4) Placing molding cassettes 8 onto conveyor belt 7.
5) Filling the recesses in the molding cassettes 8 with suspension.
6) Filled molding cassettes 8 are placed in drying cassettes for drying on racks at room temperature for at least 24 hours.
7) Upon completion of drying, the finished briquetted microcapsules are removed from molding cassettes 8 and packaged, e.g. in containers.

Example 4: Fire Extinguishing Plate

Figure 5:
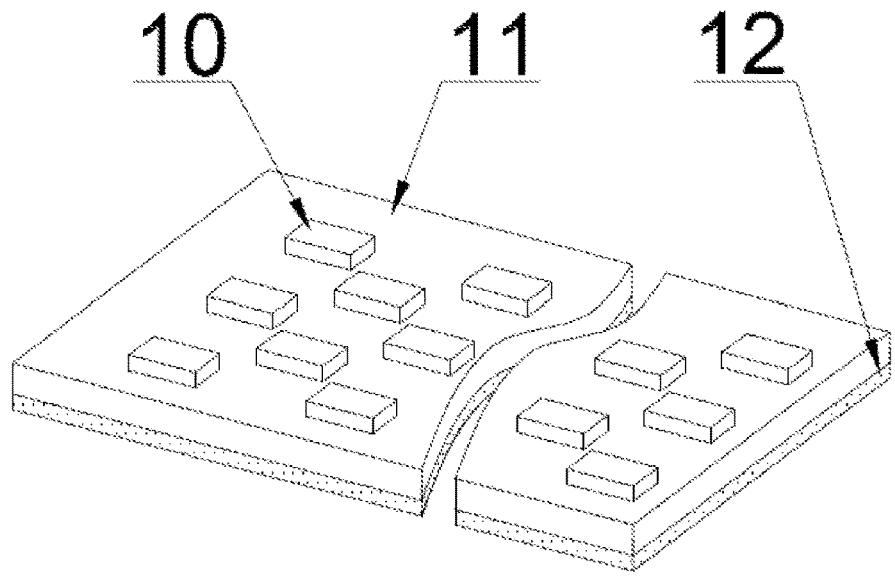
FIG. 5 is a schematic drawing of a sectional view of the design of fire extinguishing plates with briquetted microcapsules according to some embodiments of the invention.

In order to protect cabinet-made objects with a volume of no more than 50 liters, a promising area for using briquetted microcapsules may be the manufacture of fire extinguishing installations in the form of fire extinguishing plates. FIG. 5 shows a design of a fire extinguishing plate, comprising briquetted microcapsules 10, polymer binder 11 and a substrate with an adhesive layer 12.

In the manufacturing process, the plate may be glued onto the surface of the substrate 12.

In some embodiments, activation devices and RFID tags may be added to the surface of the fire extinguishing plates.

Silicone, polyurethane and other single and multicomponent polymers can be used as a polymer binder.

In some embodiments, heat-accumulating filler materials, e.g. in the form of aluminum powder, aluminum oxide and other fillers, may be added to the polymer binder 11.

For example, sheets of polyethylene terephthalate (hereinafter referred to as PET) and other sheet polymer materials, e.g. polymer sheets having a thickness of less than 0.5 mm can be used as a substrate. On one side of the polymer sheet, an adhesive layer is applied which is subsequently protected, e.g. by siliconized paper.

The production cycle of fire extinguishing plates with briquetted microcapsules 10, polymer binder 11 made of polyurethane and a substrate with an adhesive layer 12 made of PET is outlined below:

1) A roll of substrate with an adhesive layer 12 is cut into sheets measuring 21×31 cm, e.g. using a laser cutting machine.
2) The sheets are placed in silicone molds. Thereby, the adhesive layer may be located between the substrate 12 and polymer binder 11.
3) Briquetted microcapsules 10 are placed manually or automatically on the prepared substrates, e.g. the microcapsules 10 may be placed in a checkerboard pattern.

4) The polyurethane components are mixed in the required proportions in a mixer.
5) The finished polymer binder 11 is poured into the prepared mold.
6) Plate blanks in molds are placed in drying cassettes for drying on racks at room temperature for at least 24 hours.
7) Upon completion of drying, plate blanks are removed from the molds, cut by means of a guillotine into finished product format, packaged and sent to customers.

Example 5: Fire Extinguishing Cord

Figure 6:
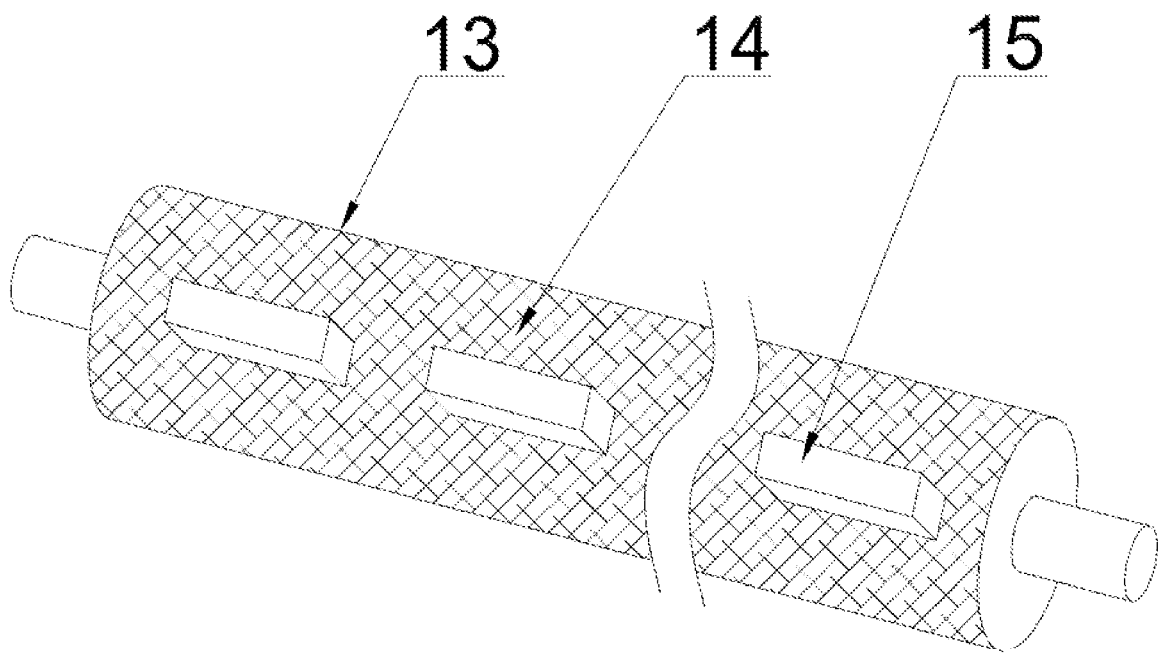
FIG. 6 is a schematic drawing of a sectional view of the structure of a fire extinguishing cord with briquetted microcapsules according to some embodiments of the invention.

A promising area for the use of microcapsules is in the manufacture of fire extinguishing installations in the form of a self-activating fire extinguishing cords. Such cords may be used to protect cabinet-made objects, e.g. with a volume over 50 liters, as well as cable channels. FIG. 6 shows a fire extinguishing cord including braid 13, heating composition 14, briquetted microcapsules 15.

When a fire extinguishing cord is exposed to flame, the heating composition is activated and the rapid release of FEA of briquetted microcapsules proceeds throughout the length of the cord In some embodiments, activation devices as well as RFID tags may be used in combination with the fire extinguishing cords. For example, an activation device may include an igniter that triggers the activation of the microcapsules by an electrical impulse.

The braiding material can be fiberglass or silica, as well as other types of threads.

For example, a mixture of thermal compositions based on an oxidizer can be used as a heating composition: sodium nitrate, potassium nitrate, etc. may be mixed with fuel, e.g. shellac, lactose, etc., to create longitudinal cracks along the cord structure by reaching a defined activation temperature to release the FEA present in the microcapsules.

Installation of the fire extinguishing cord inside the protected object may be carried out in a snake-like way, e.g. by placing the cord in locations that are most likely affected by a fire.

The production of a fire extinguishing cord requires braid 13, e.g. made of a fiberglass thread, heating composition 14, e.g. a heating composition that includes sodium nitrate mixed with lactose, and briquetted microcapsules 15:
1) A braiding machine may be used to prepare braid 13 of fiberglass threat having a required diameter and weaving density.
2) Sodium nitrate 70% is mixed with lactose 30% in a V-shaped mixer to indiscrete mass and plasticized with water until the heating composition 14 is given the required plasticity.
3) The finished heating composition 14 is mixed in a mixer with briquetted microcapsules 15 and the resulting mixture is loaded into a dispenser tank of a cord filling installation.
4) The prepared braid 13 is manually or automatically pulled onto the fitting of the cord filling installation and is filled with the mixture.
5) A prepared cord, e.g. a 20-meter-long fire extinguishing cord may be coiled up onto a drum and dried at room temperature for 24 hours.
6) The prepared fire extinguishing cord may be cut to a size depending on its desired use in a product, packaged and sent to customers.

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A composition comprising a microencapsulated fire extinguishing agent, comprising:
   a fire extinguishing agent (FEA) absorbed into a porous matrix; and
   a coating material surrounding said porous matrix, wherein said coating material is configured to disintegrate at a temperature which is higher than the boiling point of said FEA in said matrix, thereby releasing the FEA in superheated vapor form, wherein said coating material further comprises a heat-accumulating material selected from the group consisting of: aluminum powder, aluminum oxide, and combinations thereof.

2. The composition according to claim 1, wherein said fire extinguishing agent is a perfluorinated agent.

3. The composition according to claim 2, wherein said perfluorinated agent is perfluoro(2-methyl-3-pentanone).

4. The composition according to claim 1, wherein said fire extinguishing agent has a boiling point of less than 40° C.

5. The composition according to claim 1, wherein said porous matrix comprises zeolite, vermiculite, or a combination thereof.

6. The composition according to claim 1, wherein said porous matrix is mechanically rigid.

7. The composition according to claim 1, wherein said coating material is a single-component polymer or a multi-component polymer.

8. The composition according to claim 1, wherein said coating material is selected from the group consisting of: sodium silicate, polyvinyl alcohol, and combinations thereof.

9. The composition according to claim 1, wherein said fire extinguishing agent is activated by an external temperature in a range of 110 to 130° C.

10. The composition according to claim 1, wherein said fire extinguishing agent occupies at least 40% of an internal volume of said porous matrix.

11. The composition according to claim 1, wherein said composition consists essentially of spherical or substantially spherical particles having an external diameter in a range of about 0.5 mm to about 1.5 mm.

* * * * *